Dec. 21, 1926.
H. T. BARNHART
HUMIDITY GAUGE FOR HOT AIR FURNACES
Filed Dec. 15, 1925
1,611,505
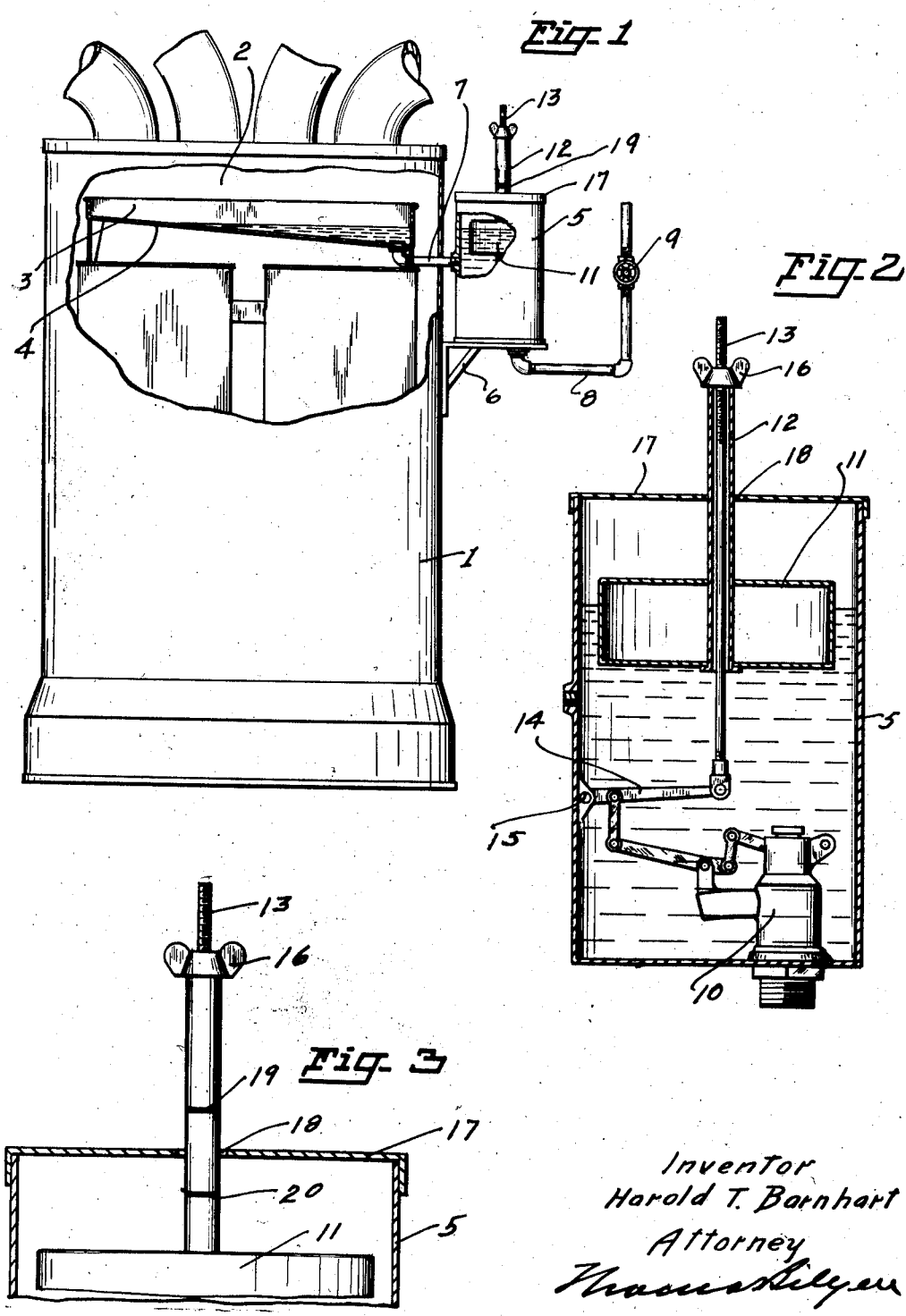
Inventor
Harold T. Barnhart
Attorney Patented Dec. 21, 1926.

1,611,505

UNITED STATES PATENT OFFICE.

HAROLD T. BARNHART, OF PORTLAND, OREGON.

HUMIDITY GAUGE FOR HOT-AIR FURNACES.

Application filed December 15, 1925. Serial No. 75,527.

The object of my invention is to indicate upon the exterior of the furnace, how much liquid is maintained, or being supplied within the liquid container, within the furnace.

A further object of my invention is to indicate upon a graduated sleeve, the height or amount of liquid being maintained within the liquid container, within the heated chamber, within the furnace.

A further object of my invention is to control, by automatic means, the amount of liquid being maintained and to further indicate by automatic means, upon the exterior of the furnace, the level of the liquid, within the liquid container, within the heated chamber.

A further object of my invention is to provide a liquid container to be placed within the heated chamber of the furnace whose bottom slopes in relation to the horizontal, the object of which is to govern the amount of surface of liquid to be contained therein and therefore govern the amount of evaporation that will take place in a given time, which indirectly will determine the amount of humidity that will be held in suspension within the air passing therefrom.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this application.

In the drawings:—

Fig. 1 is a side elevation, partially in section of the furnace and my device in place upon the exterior thereof.

Fig. 2 is a cross section view of my device, illustrating the container for the liquid, the float within the indicator, and the valve for the controlling of the outflow of liquid from the container into the hot air chamber of the furnace.

Fig. 3 is an enlarged, detached view of the graduate indicator and illustrating means for regulating the height of the same.

Like reference characters refer to like parts throughout the several views.

1 is a hot air furnace, having a hot air chamber 2, disposed in the interior thereof, in which a liquid container is placed, the bottom wall 4 of which is inclined to the horizontal and adapted to maintain a liquid therein and having an open top surface to permit of the free evaporation of the liquid therefrom. The amount of evaporating surface of liquid is determined by the sloping bottom of this container. If a relatively high humidity is desired the total bottom surface is covered by liquid at all times which will give a maximum of liquid surface exposed within the heated chamber whereas if a low humidity is desired but a portion of the bottom will be covered with the liquid. The level of the liquid to be maintained therein determines, within certain limits, the amount of liquid evaporating surface. This liquid level is determined and regulated by a valve float and lever system, which may be regulated by a manipulative means disposed upon the exterior of the furnace and within reach and sight of the attendant of the furnace. Disposed upon the exterior of the furnace, is a liquid container 5, supported upon the wall structure of the furnace by any suitable fastening means, as a bracket 6. Connecting the liquid container 5, with the evaporating container 4, is a suitable piping connection 7. Liquid is supplied to the liquid container 5, through a piping system 8, which is connected to a source of supply not here shown, the piping system 8, having a valve 9, in the line for the cutting off of the water supply when desired. This piping system 8, terminates within the liquid container in a suitable float valve which is indicated by the valve casing 10, which is connected by a suitable link mechanism to the stem 13. The threaded stem 13, is pivotally secured to link 14, on its lower end which is secured to the inner wall surface of the liquid container and hinged thereto, as shown at 15. The threaded stem 13, passes through the sleeve 12 of the float 11 and is secured thereto by an adjusting thumb nut 16. The sleeve 12 of the float 11, passes through the closure 17, of the liquid container and is in working relationship therewith, the same passing through opening 18, centrally disposed on the lid closure 17. The height of the liquid to be maintained within the evaporating pan 3, may be definitely determined by location and adjustment of the thumb nut 16, and in the event that the liquid supply for any reason should cease to be furnished to the liquid container 5, the threaded stem and the float will lower into the liquid container and will indicate thereby that the supply has failed. This is accomplished by the graduations 19 and 20, disposed upon the sleeve 12, indicating that the float has been lowered into the liquid container below the graduations.

While the form of apparatus herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. A humidity gauge for hot air furnaces, in combination with a hot air furnace having a hot air chamber, of a liquid holding pan having an inclined bottom surface, placed within the hot air chamber of the furnace, a liquid holding receptacle placed on the exterior of the furnace, automatic means for feeding liquid from the receptacle to the pan and means for regulating the amount of liquid surface to be exposed within the pan.

2. A humidity gauge for hot air furnaces, in combination with a hot air furnace having a hot air chamber, of a liquid holding pan having an inclined bottom surface, placed within the heated air chamber of the furnace, automatic means for feeding liquid to the pan and means whereby the amount of surface of liquid to be exposed upon the pan may be regulated.

3. A humidity gauge for hot air furnaces, comprising an inclined bottom liquid holding pan to be placed within the hot air outlet leading from the furnace, automatic liquid supplying means for the liquid holding pan and regulatory means for governing the amount of surface of liquid to be exposed within the pan.

4. A humidity gauge for hot air furnaces, in combination with a hot air furnace having a hot air chamber, of an inclined bottom liquid holding pan disposed within the hot air chamber of the furnace, an automatic feed for supplying liquid to said pan and whereby the amount of surface of liquid may be predetermined and automatically maintained.

5. A humidity gauge for hot air furnaces comprising, an inclined bottom liquid holding pan, an automatic liquid feed for supplying liquid to said pan at a constant level and regulatory means whereby the humidity of the hot air to be supplied from the furnace may be governed.

HAROLD T. BARNHART.